(12) United States Patent
Dayan et al.

(10) Patent No.: US 7,917,353 B2
(45) Date of Patent: Mar. 29, 2011

(54) HYBRID TEXT SEGMENTATION USING N-GRAMS AND LEXICAL INFORMATION

(75) Inventors: Yigal Shai Dayan, Jerusalem (IL); Josemina Marcella Magdalen, Jerusalem (IL); Victoria Mazel, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 11/693,324

(22) Filed: Mar. 29, 2007

(65) Prior Publication Data

US 2008/0243487 A1   Oct. 2, 2008

(51) Int. Cl.
*G06F 17/21* (2006.01)
(52) U.S. Cl. .......................................................... 704/9
(58) Field of Classification Search .................. 704/1, 9, 704/10; 707/100
See application file for complete search history.

(56) References Cited

U.S. PATENT DOCUMENTS

| | | | | |
|---|---|---|---|---|
| 6,131,082 | A * | 10/2000 | Hargrave et al. | 704/7 |
| 6,173,252 | B1 * | 1/2001 | Qiu et al. | 704/9 |
| 6,311,152 | B1 * | 10/2001 | Bai et al. | 704/9 |
| 7,627,562 | B2 * | 12/2009 | Kacmarcik et al. | 707/3 |
| 2005/0060150 | A1 * | 3/2005 | Li et al. | 704/240 |

OTHER PUBLICATIONS

Song et al. "Voting between Dictionary-based and Subword Tagging Models for Chinese Word Segmentation," Proceedings of the Fifth SIGHAN Workshop on Chinese Language Processing, Sidney, Jul. 2006, pp. 126-129.*
Emerson. "Segmenting Chinese in Unicode," Proc. of the 16th International Unicode Conference, Amsterdam, Mar. 2000, pp. 1-10.*
Wu, Dakai, et al. (Improving Chinese Tokenization with Linguistic Filters on Statistical Lexical Acquisition), Article, pp. 180-181.
Banerjee, Satanjeev, et al. (The Design, Implementation, and Use of the Ngram Statistics Package), Article, 2003, pp. 370-381, Copyright Springer-Verlag Berlin Heidelberg.
Befferman, Doug, et al, "Text Segmentation Using Exponential Models", pp. 35-46.
Cettolo, Mauro, et al., "Text Segmentation Criteria for Statical Machine Translation".
Chen, Berlin, et al."A Discriminative HMM/N-Gram-Based Retrieval Approach for Mandarin Spoken Documents" Jun. 2004, pp. 128-145, vol. 3 No. 2. Published by ACM, Inc. in New York, NY.
Cowie, Jim, et al, "Improving Robust Domain Independent Summarization" pp. 171-177.
Fung, Pascale, et al. "Statistical Augmentation of a Chinese Machine-Readable Dictionary" Jun. 7, 1994, pp. 1-17.
Hackett, Paul G. et al., "Comparison of Word-Based and Syllable-Based Retrieval for Tibetan", Copyright by ACM, 2 pages.
Li, Yuk-Chi, et al. "Query Expansion using Phonetic Confusion for Chinese Spoken Document Retrieval" pp. 89-93.
McNamee, Paul, "Experiments in the Retrieval of Unsegmented Japanese Text at the NTCIR-2 Workshop".

(Continued)

*Primary Examiner* — Susan McFadden
(74) *Attorney, Agent, or Firm* — Marcia L. Doubet

(57) ABSTRACT

A hybrid n-gram/lexical analysis tokenization system including a lexicon and a hybrid tokenizer operative to perform both N-gram tokenization of a text and lexical analysis tokenization of a text using the lexicon, and to construct either of an index and a classifier from the results of both of the N-gram tokenization and the lexical analysis tokenization, where the hybrid tokenizer is implemented in at least one of computer hardware and computer software and is embodied within a computer-readable medium.

6 Claims, 2 Drawing Sheets

OTHER PUBLICATIONS

McNamee, Paul, "Why You Should Use N-grams for Multilingual Information Retrieval"., 1 page, UMBC EBIQUITY Research Group Website Article, Oct. 18, 2006.

Nagata, Masaaki, A Self-Organizing Japanese Word Segmenter using Heuristic Word Identification and Re-estimation, pp. 203-215.

Sproat, Richard, et al., "A Stochastic Finite-State Word-Segmentation Algorithm for Chinese", Copy right 1996 Association for Computational Linguistics, PA, USA, vol. 22, No. 3.

Thanopoulos, Aristomenis, et al., "Text Tokenization for Knowledge-free Automatic Extraction of Lexical Similarities" TALN 2003, Batz-sur-Mer, Jun. 11-14, 2003.

Ratnaparkhi, Adwait, "Treebank Tokenization", Article from www.cis.upenn.edu/~treebank/tokenization.html.

Wiki, Collab, "TextNSP", article from www.topicalizer.com/bwilmsmann/wiki/index.php/TextNSP, pp. 1-17.

* cited by examiner

HYBRID TEXT SEGMENTATION USING N-GRAMS AND LEXICAL INFORMATION

FIELD OF THE INVENTION

The present invention relates to the field of text analysis, segmentation, and tokenization.

BACKGROUND OF THE INVENTION

Search engines and document classification systems typically rely on lexical analysis or n-gram tokenization of source document text in the construction of their search indices or classifiers. In text segmentation using lexical analysis, tokenization rules, lexicons, and morphological rules are consulted in order to identify words and other tokens. In n-gram tokenization a source text is broken up into tokens of one or more contiguous characters, optionally taking the letters or ideogram characteristics into account. In both cases the tokens are then indexed or classified. For Indo-European languages, the text segmentation takes advantage of separators that appear between words, such as blank spaces and punctuation characters. However, in Asian languages such as Chinese and Japanese, these separators are rarely used, and therefore either n-gram tokenization or lexical analysis tokenization is typically performed.

One disadvantage of employing an index or classifier built using lexical analysis tokenization is that it tends to provide partial results, since the lexicon is often incomplete, and a query that includes a word that is not in the lexicon will not be typically found in the index or classifier. One disadvantage of employing an index or classifier built using n-gram tokenization is that it tends to provide spurious results, such as where unrelated words have one or more n-grams in common.

SUMMARY OF THE INVENTION

The present invention in embodiments thereof discloses novel systems and methods for text segmentation using hybrid n-gram/lexical analysis tokenization.

In one aspect of the present invention a hybrid n-gram/lexical analysis tokenization system is provided including a lexicon, and a hybrid tokenizer operative to perform both N-gram tokenization of a text and lexical analysis tokenization of a text using the lexicon, and construct either of an index and a classifier from the results of both of the N-gram tokenization and the lexical analysis tokenization, where the hybrid tokenizer is implemented in at least one of computer hardware and computer software and is embodied within a computer-readable medium.

In another aspect of the present invention the hybrid tokenizer is operative to omit from either of the index and the classifier any n-grams generated for a segment of the text where a word is identified by the hybrid tokenizer as corresponding to the segment of the text.

In another aspect of the present invention the hybrid tokenizer is operative to perform the N-gram tokenization and the lexical analysis tokenization at least partially concurrently.

In another aspect of the present invention a hybrid n-gram/lexical analysis tokenization method is provided including performing N-gram tokenization of a text, performing lexical analysis tokenization of the text, and constructing either of an index and a classifier from the results of both of the N-gram tokenization and the lexical analysis tokenization.

In another aspect of the present invention further includes omitting from either of the index and the classifier any n-grams generated for a segment of the text where a word is identified during the performing lexical analysis tokenization step as corresponding to the segment of the text. In another aspect of the present invention the performing steps are performed at least partially concurrently.

In another aspect of the present invention a computer program is provided embodied on a computer-readable medium, the computer program including a first code segment operative to perform N-gram tokenization of a text, a second code segment operative to perform lexical analysis tokenization of the text, and a third code segment operative to construct either of an index and a classifier from the results of both of the N-gram tokenization and the lexical analysis tokenization.

BRIEF DESCRIPTION OF THE DRAWINGS

The present invention in embodiments thereof will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
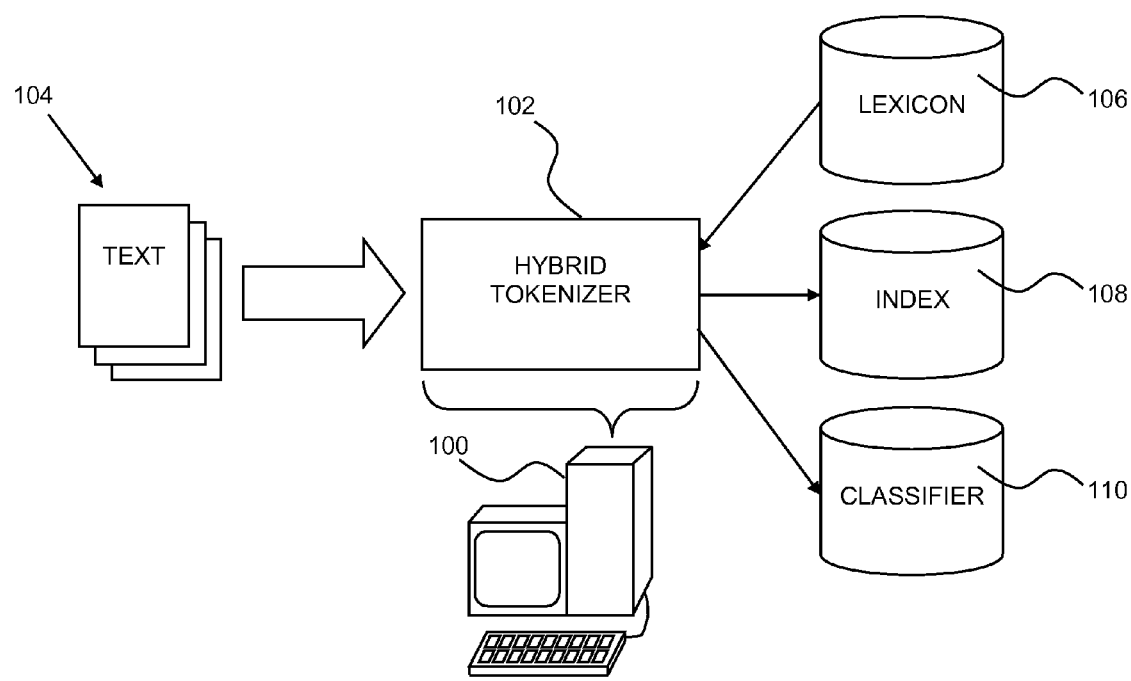
FIG. 1 is a simplified illustration of a hybrid lexical analysis/n-gram tokenization system, constructed and operative in accordance with an embodiment of the invention.
Figure 2:
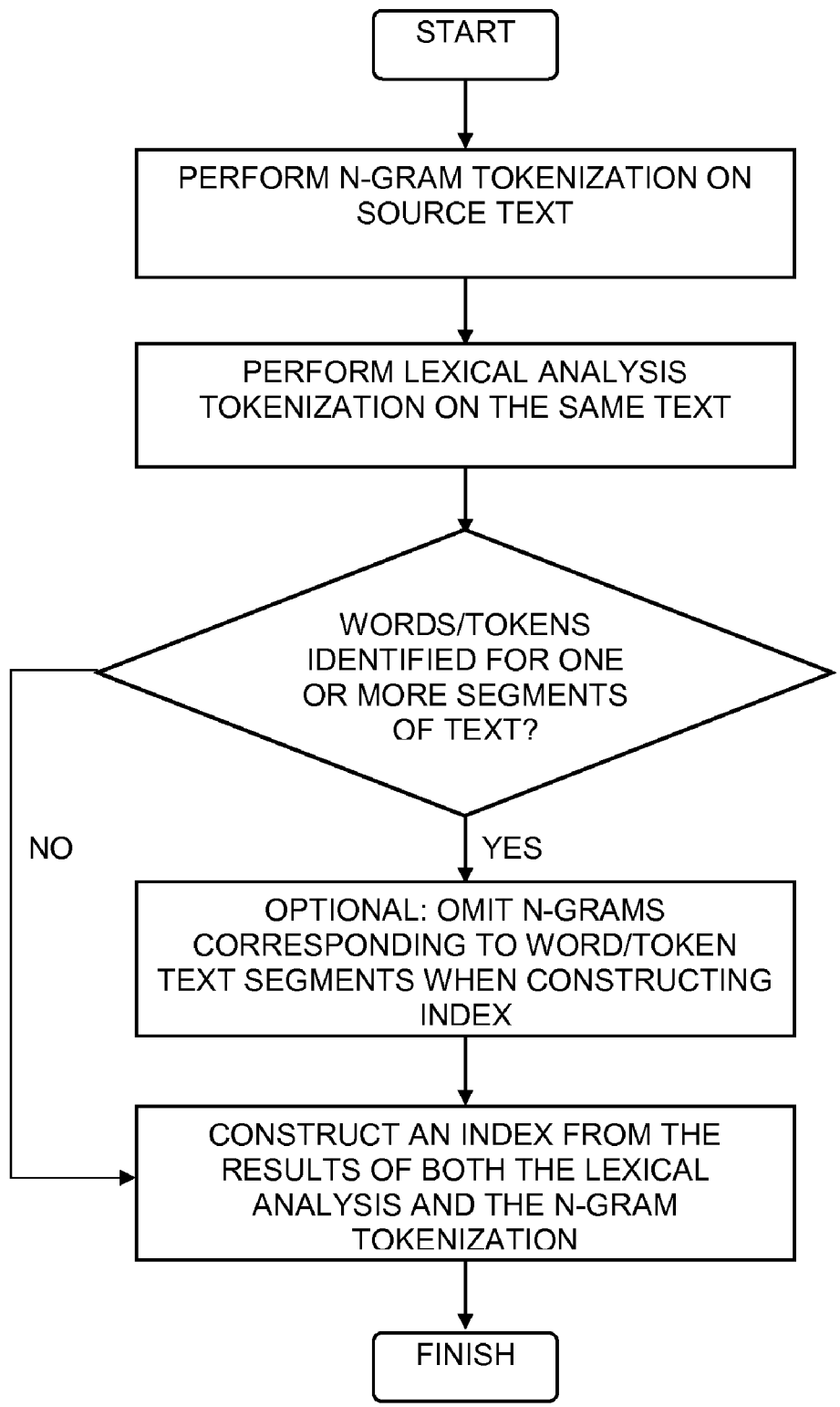
FIG. 2 is a simplified illustration of an exemplary method of operation of the system of FIG. 1, operative in accordance with an embodiment of the invention.

Reference is now made to FIG. 1, which is a simplified illustration of a hybrid n-gram/lexical analysis tokenization system, constructed and operative in accordance with an embodiment of the invention, and additionally to FIG. 2, which is a simplified illustration of an exemplary method of operation of the system of FIG. 1, operative in accordance with an embodiment of the invention. In the system of FIG. 1 and method of FIG. 2, a computer 100 is configured with a hybrid tokenizer 102 which performs hybrid tokenization on text of one or more documents 104 as follows. N-gram tokenization is performed on the text using conventional techniques, such as by converting the text into bigrams or trigrams. Before, during, or after performing n-gram tokenization, lexical analysis tokenization of the same text is also performed using conventional techniques, such as where hybrid tokenizer 102 employs a lexicon 106 to identify words. Hybrid tokenizer 102 then constructs an index 108 and/or a classifier 110 from the results of both the lexical analysis tokenization and the n-gram tokenization. However, where a word is identified for a particular segment of text during lexical analysis, any n-grams generated for the same text segment during n-gram tokenization may optionally be omitted when constructing the index or classifier.

When performing a search query on index 108, the hybrid lexical analysis tokenization and n-gram tokenization method described hereinabove is preferably performed on the query text, the results of which are used to search index 108 using conventional techniques. Similarly, when performing document classification using classifier 110, the hybrid method is preferably performed on the text to be classified.

The hybrid approach of the present invention is believed to be superior to the individual approaches of n-gram tokenization versus lexical analysis tokenization given their disadvantages as described hereinabove.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A hybrid n-gram/lexical analysis tokenization system, comprising:
    a computer comprising a processor;
    a lexicon; and
    a hybrid tokenizer operative, using the processor of the computer, to perform both N-gram tokenization of a text and lexical analysis tokenization of the text using said lexicon, and construct an output comprising either of an index and a classifier from results of both of said N-gram tokenization and said lexical analysis tokenization, wherein:
        for each segment of the text identified as a word by the lexical analysis tokenization, the hybrid tokenizer is operative to omit from the output any N-grams generated for the segment by the N-gram tokenization; and
        said hybrid tokenizer is implemented in at least one of computer hardware and computer software and is embodied within a computer-readable storage medium read by the processor of the computer.

2. A system according to claim 1 wherein said hybrid tokenizer is operative to perform said N-gram tokenization and said lexical analysis tokenization at least partially concurrently.

3. A hybrid n-gram/lexical analysis tokenization method, comprising:
    performing, using a processor of a computer, an N-gram tokenization of a text;
    performing, using the processor of the computer, a lexical analysis tokenization of said text; and
    constructing, using the processor of the computer, an output comprising either of an index and a classifier from results of both of said N-gram tokenization and said lexical analysis tokenization wherein, for each segment of the text identified as a word when performing the lexical analysis tokenization, the constructing omits from the output any N-grams generated for the segment by the N-gram tokenization.

4. A system according to claim 3, wherein performing the N-gram tokenization and performing the lexical analysis tokenization are performed at least partially concurrently.

5. A computer program stored on a non-transitory computer-readable storage medium, the computer program comprising:
    a first code segment operative, when executed by a computer, to perform N-gram tokenization of a text;
    a second code segment operative, when executed by the computer, to perform lexical analysis tokenization of said text; and
    a third code segment operative, when executed by the computer, to construct an output comprising either of an index and a classifier from results of both of said N-gram tokenization and said lexical analysis tokenization wherein, for each segment of the text identified as a word when performing the lexical analysis tokenization, the constructing omits from the output any N-grams generated for the segment by the N-gram tokenization.

6. A computer program according to claim 5, wherein said first code segment and said second code segment are executed, by the computer, at least partially concurrently.

* * * * *